(12) United States Patent
Decoteau

(10) Patent No.: US 6,502,727 B1
(45) Date of Patent: Jan. 7, 2003

(54) DEVICE AND METHOD FOR HOLDING A HANDHELD OBJECT

(76) Inventor: Daniel Decoteau, 417 N. Broad St., Lansdale, PA (US) 19446

( * ) Notice: Subject to any disclaimer, the term of this patent is extended or adjusted under 35 U.S.C. 154(b) by 0 days.

(21) Appl. No.: 09/912,624

(22) Filed: Jul. 26, 2001

(51) Int. Cl.⁷ .............................................. B65H 75/40
(52) U.S. Cl. ........................ 224/162; 224/183; 224/269; 224/930; 242/379.2
(58) Field of Search ................................. 224/162, 183, 224/254, 269, 930; 242/379.2, 380, 404.3

(56) References Cited

U.S. PATENT DOCUMENTS

| | | | | |
|---|---|---|---|---|
| 5,025,966 A | * | 6/1991 | Potter | 224/183 |
| 5,213,240 A | * | 5/1993 | Dietz et al. | 224/183 |
| 5,833,165 A | * | 11/1998 | Paugh | 242/379.2 |
| 5,938,137 A | | 8/1999 | Poulson | 242/379.2 |
| 6,135,408 A | * | 10/2000 | Richter | 224/183 |
| 6,257,469 B1 | * | 7/2001 | Cohn | 206/86 |
| 6,290,158 B1 | * | 9/2001 | Huang | 242/379 |
| 6,352,186 B1 | * | 3/2002 | Endo | 224/254 |
| 6,379,178 B1 | * | 4/2002 | Jones et al. | 224/483 |

* cited by examiner

*Primary Examiner*—Stephen K. Cronin
(74) *Attorney, Agent, or Firm*—LaMorte & Associates

(57) ABSTRACT

A device and associated method for attaching an electronic device to a tether so that it cannot be stolen or inadvertently lost. The device includes a housing. Within the housing is contained a spool and a spring for rewinding the spool. A tether extends from the spool out of the housing. The tether terminates outside of the housing with a connector element. The connector element is selectively attachable to an electronic device. As the tether is wound on the spool, the connector element is drawn toward an attachment area on the housing of the device. The connector element and the attachment area are magnetically attracted. As such, when the connector element approaches the attachment area on the housing, the connector element becomes magnetically affixed to the attachment area, thereby joining the electronic device to the housing in a fixed orientation.

18 Claims, 3 Drawing Sheets

DEVICE AND METHOD FOR HOLDING A HANDHELD OBJECT

BACKGROUND OF THE INVENTION

1. Field of the Invention

The present invention relates to devices that are used to tether a handheld electronic device, such as a mobile phone, so that the electronic device cannot be accidentally dropped and/or lost. More particularly, the present invention relates to tethers that are used to retract handheld electronic devices to a secure location on a user's person.

2. Prior Art Statement

Small handheld electronic devices are becoming more commonplace in society. Handheld computers, calculators, cellular phones, beepers and the like are now carried by millions of people. As handheld electronic devices become more sophisticated, they have become smaller and lighter. A consequence of this evolution is the fact that many handheld electronic devices are now so small and lightweight that they can fall from a pocket or be dropped from a belt hook without a person realizing the loss.

In the prior art, there have been attempts to prevent the loss of handheld objects using various techniques. One technique is through the use of a proximity transceiver that detects when an object is more than a predetermined distance from a user. Such systems include a base unit that is always carried by the user and a remote unit that is attached to the handheld electronic device. When the remote unit travels a certain distance from the base unit, an alarm is sounded, thereby warning a person that the handheld electronic device has been left behind. Transceiver based systems, however, are very expensive. Furthermore, they require that a user carry the base unit in addition to the handheld electronic device. As such, users must remember to charge the batteries of the base unit and must take precautions not to lose the base unit. For these reasons, transceiver based systems are not popular.

A simpler approach used to prevent the loss of handheld electronic objects is the use of a tether. With a tethered system, a belt clip is attached to a user's belt. A tether extends from the tether that is connected to the handheld, electronic device. In this manner, the handheld electronic device cannot be accidentally dropped, lost or stolen. To prevent the tether from becoming a nuisance, tethered systems have been developed where the tether retracts into the belt clip. In this manner, the tether remains hidden until the handheld electronic device is used. Such prior art tethered systems are exemplified by U.S. Pat. No. 5,938,137 to Poulson, entitled Cellular Phone Lease.

Although retractable tethers are an effective and inexpensive way to prevent loss of a handheld electronic device, tethers do have certain disadvantages. One of those disadvantages is that the base of the retractable tether must be coupled to a person's belt, as well as the tethered handheld electronic device. Accordingly, a person must have two different objects attached to his/her belt. One object is the electronic device itself and the other is the base for the tether. Another disadvantage associated with retractable tethers is that the tether often interferes with the ability of the handheld electronic device to be connected to a person's belt. For example, suppose a person has a cellular phone with a belt clip on its back surface. The tether from the base must also be attached to the back surface of the cellular phone. As the cellular phone is returned to a person's belt, the tether becomes temporarily slack and may catch on the belt clip of the phone. The tether then interferes with the ability of the cellular phone to be clipped onto a person's belt until the tether is untangled.

A need therefore exists for an improved tether system that does not require that the base for the tether be mounted at a point different from that of the electronic device. A need also exists for an improved tether system that will minimize the chances of the tether tangling with the bound electronic device. These needs are met by the present invention as described and claimed below.

SUMMARY OF THE INVENTION

The present invention is a device and associated method for attaching an electronic device to a tether so that it cannot be stolen or inadvertently lost. The device includes a housing. Within the housing is contained a spool and a spring for rewinding the spool. A tether extends from the spool out of the housing. The tether terminates outside of the housing with a connector element. The connector element is selectively attachable to an electronic device either with adhesives or mechanical fasteners.

As the tether is wound on the spool, the connector element is drawn toward an attachment area on the housing of the device. The connector element and the attachment area are magnetically attracted. As such, when the connector element approaches the attachment area on the housing, the connector element becomes magnetically affixed to the attachment area, thereby joining the electronic device to the housing in a fixed orientation. At any time the electronic device can be removed from attachment with the housing and used. After use, the tether will retract and again pull the electronic device to the same position on the housing.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention system can be used to tether any handheld electronic device, such as a beeper, pocket computer or the like, the present invention is particularly well suited to tether cellular telephones. Accordingly, by way of example, the present invention is illustrated in use supporting a cellar telephone in order to set forth the best mode of the invention.

Figure 1:
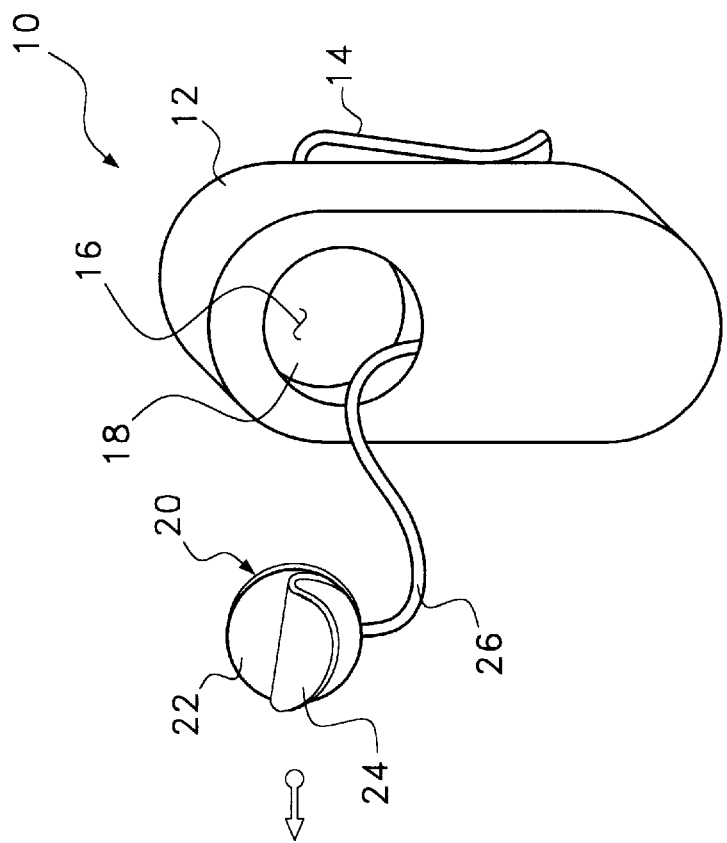
FIG. 1 is a perspective view of an exemplary embodiment of the present invention device shown in conjunction with a cellular telephone.
Figure 1:
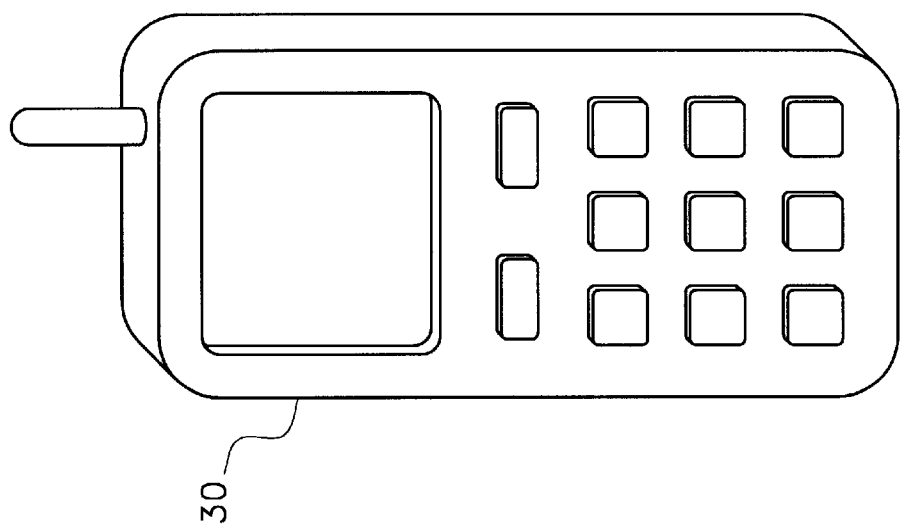

Referring to FIG. 1, an exemplary embodiment of the present invention device 10 is shown. The device 10 includes a housing 12. The housing 12 has a rear external surface and an opposite front external-surface. A belt clip 14 is coupled to the rear external surface. As such, the housing 12 can be attached to a belt, pocket book fold, vehicle sun visor, or any other thin object that can be engaged by a belt clip. On the front external surface of the housing is located a depression 16. Within the depression 16 is an attachment area 18. The attachment area 18 is the point of external attachment to the housing 12, as will later be explained.

A connector element 20 is provided. The connector element 20 has a peripheral shape and width that enables the connector element 20 to pass into the depression 16 on the housing 12 and rest against the attachment area 18 at the base of that depression 16. The attachment area 18 on the housing 12 and the connector element 20 are magnetically attracted. As such, both the attachment area 18 and the connector element 20 can be actively magnetic or one of these surfaces can be magnetic and the other can contain a ferromagnetic metal. In a preferred embodiment, both the attachment area 18 on the housing 12 and the connector element 20 contain at least one rare earth magnet. Such magnets are lightweight and create a very strong magnetic field per unit weight. As such, it will be understood that when the connector element 20 approaches the attachment area 18, the connector element 20 will be magnetically attracted to the attachment area 18, wherein magnetic forces will bias the connector element 20 against the attachment area 18.

In the shown embodiment, the connector element 20 is disk shaped. On the front of the connector element 20 is located a piece of double sided tape 22. One side of the tape 22 is adhered to the connector element 20. A removable protective cover 24 protects the other side of the double-sided tape 22. When the protective cover 24 is removed, the connector element 20 can be pressed against the rear surface of an electronic device 30, thereby adhesively interconnecting the connector element 20 to the back of the electronic device 30.

In the embodiment of FIG. 1, a piece of double sided tape 22 is used to interconnect the connector element 20 to the back of an electronic device 30. Such a connection means is merely exemplary. It should be understood that the double-sided tape 22 could be replaced with other types of connection means. For example, glue can be applied directly between the connector element 20 and the electronic device 30. Mechanical fasteners that engage the electronic device 30, such as clips, hooks, clamps and the like can also be used. The use of double-sided tape is only exemplary and is illustrated because it is a highly effective and inexpensive way to interconnect the connector element to an electronic device. However, other attachment means are intended to be included in the scope of this disclosure.

A flexible tether 26 interconnects the connector element 20 to the housing 12. The tether has a length of between two feet and four feet when fully extended. However, the tether 26 is retractable within the housing 12. The tether 26 exits the housing 12 at a point proximate the attachment area 18 of the housing 12. As such, when the tether 26 is retracted into the housing 12, the tether 26 pulls the connector element 20 to the attachment area 18. Once the connector element 20 is close to the attachment area 18, magnetic forces pull the connector element 20 against the attachment area 18.

Figure 2:
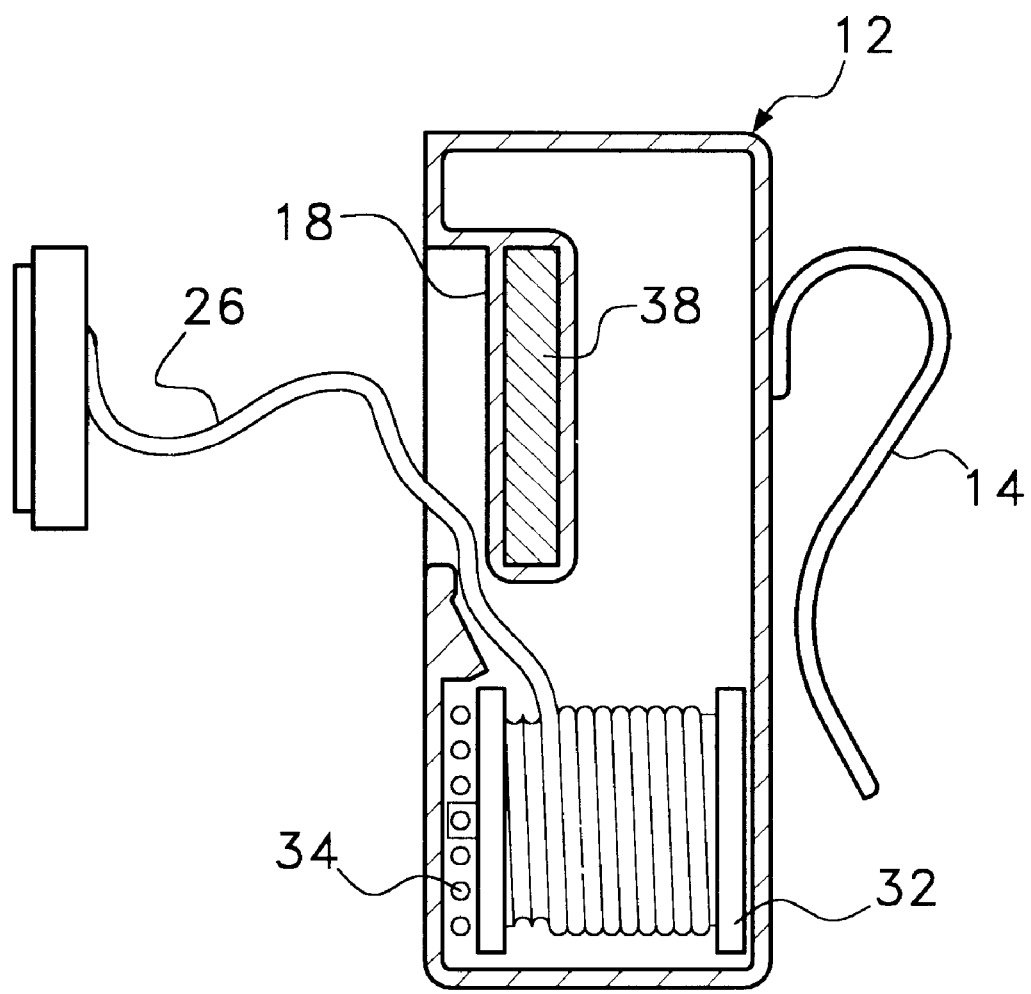
FIG. 2 is a selectively cross-sectioned view of the device shown in FIG. 1.

Referring to FIG. 2, it can be seen that within the housing 12 is located a spool 32. The tether 26 winds around the spool 32. Next to the spool 32 is a retraction spring 34. The retraction spring 34 is set to bias the spool 32 to its fully wound condition. As such, when the tether 26 is pulled out of the housing 12, the spool 32 turns and energy is stored in the retraction spring 34. The energy from the spring biases the spool 32 to rewind. Accordingly, when any slack is present in the extended tether 26, that slack is rewound onto the spool 32.

Also from FIG. 2, it can be seen that the attachment area 18 of the housing 12 itself may not be directly magnet or ferromagnetic. However, by placing a magnet 38 against the housing 12 at the point of the attachment area 18, the magnetic field of the magnet 38 extends through the attachment area 18. The presence of the magnetic field makes the attachment area 18 magnetic in a passive manner.

Figure 3:
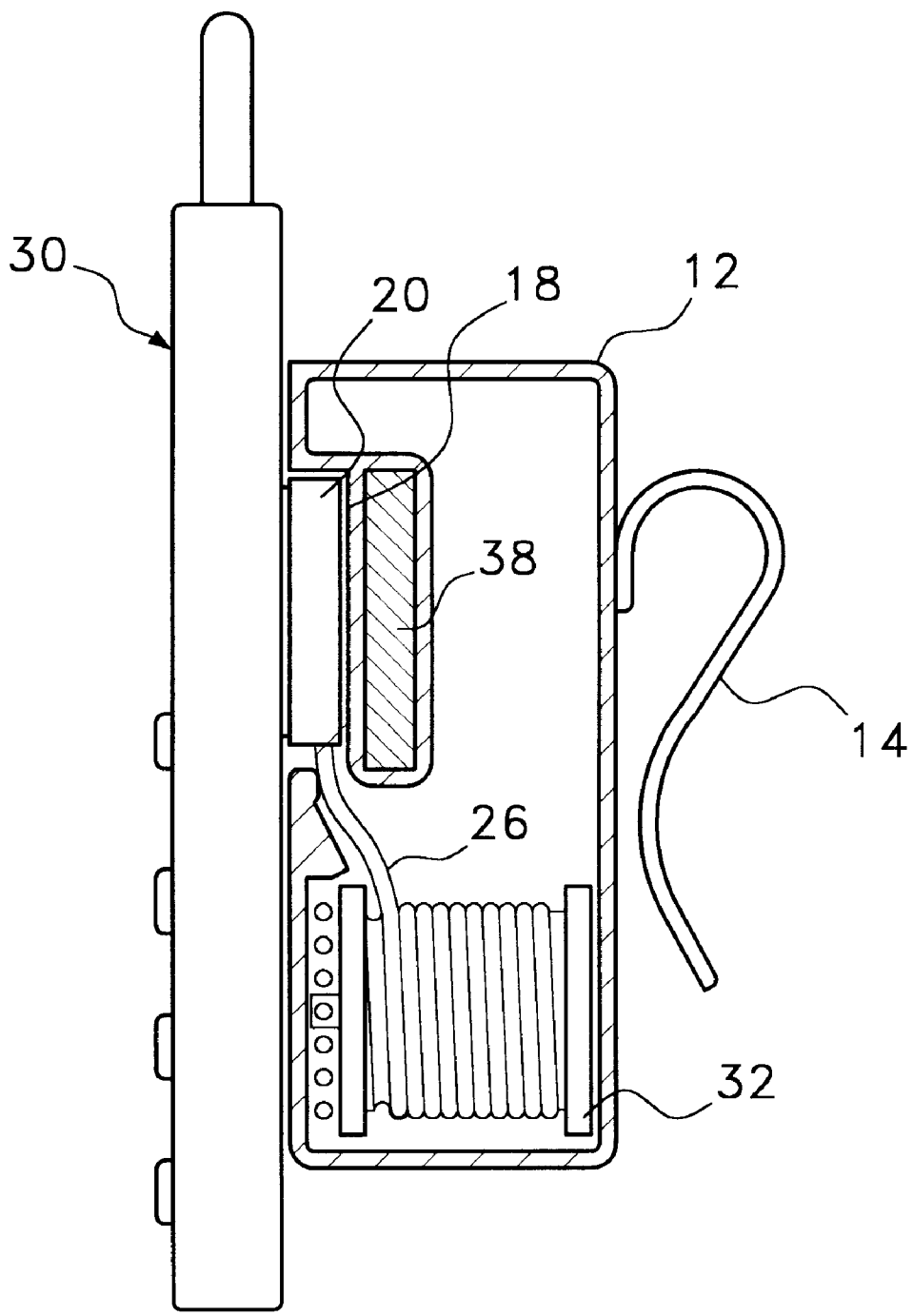
FIG. 3 is the same view as FIG. 2 with an electronic device shown pulled into a fully retracted position.

Referring to FIG. 3, it can be seen that when the connector element 20 is attached to an electronic device 30 and no external forces are applied to the electronic device 30, the tether 26 is retracted around the spool 32 by the retraction spring 34. This causes the connector element 20 and the electronic device 30 to move against the housing 12. Once in close proximity, the connector element 20 is magnetically pulled against the attachment area 18 of the housing 12 and the electronic device 30 is in its stored position. The belt clip 14 on the back of the housing 12 can then be applied to a person's belt or any other object. As such, there is only one point of attachment to a person's belt. Furthermore, since a clip need not be used directly on the back of the electronic device 30, the probability of the tether 26 becoming tangled on the electronic device 30 is greatly reduced.

To use the electronic device 30, the electronic device 30 is simply pulled away from the housing 12 with a force that overcomes the magnetic attraction between the connector element 20 and the attachment area 18 of the housing 12. As the electronic device 30 is pulled away from the housing 12, the tether 26 unwinds. If the electronic device 30 is ever dropped or left unheld, the tether 26 automatically retracts into the housing 12 and pulls the electronic device 30 back to the stored position shown.

In the shown embodiment, the tether 26 automatically retracts if the retraction force of the tether 26 surpasses that of the force holding the electronic device 30. If desired, a locking mechanism can be added to the present invention that locks the tether at a desired length. In the prior art, there are many mechanisms that exist for temporarily retaining tethers at desired lengths. Such mechanisms are commonplace on vacuum cleaner cords, tape measures, chalk lines and the like. Any such prior art locking mechanism can be adapted for use with the present invention.

It will be understood that the embodiment of the present invention device and method described and illustrated is merely exemplary and a person skilled in the art can make many variations to the shown embodiment. For example, the housing can be configured in many different ways. The size, shape and location of the attachment area and connector element can also be changed as desired. Finally, the means of attachment between the connector element and the electronic device can be altered in many ways. All such alternate embodiments and modifications are intended to be included within the scope of the present invention as defined below in the claims.

What is claimed is:

1. A device, comprising:
   a housing having an external surface with an attachment area thereon, said housing defining an internal chamber;
   a spool disposed within said internal chamber;
   a connector element, wherein said connector element and said attachment area are magnetically attracted;
   an attachment means disposed on a surface of said connector element, wherein said attachment means enables said connector element to be affixed to an external object; and
   a tether coupled between said spool and said connector element.

2. The device according to claim 1, further including a spring coupled to said spool for providing a bias to said spool that causes said tether to wind on said spool.

3. The device according to claim 1, further including a belt clip coupled to said housing.

4. The device according to claim 1, wherein said attachment means is selected from a group consisting of tapes, adhesives, and mechanical fasteners.

5. The device according to claim 1, wherein said tether is between two feet and four feet in length.

6. The device according to claim 1, wherein said housing has a depression thereon and said attachment area is disposed in said depression, wherein said connector element is sized to fit within said depression.

7. An assembly, comprising:

an electronic device;

a connector element mounted to said electronic device;

a housing having an attachment area thereon, wherein said connector element and said attachment area are magnetically attracted; and a tether interconnecting said housing to said connector element.

8. The assembly according to claim 7, wherein said housing defines an internal chamber and a spool is disposed within said internal chamber, wherein said tether is coupled to said spool within said housing.

9. The assembly according to claim 8, further including a spring coupled to said spool for providing a bias to said spool that causes said tether to wind on said spool.

10. The assembly according to claim 7, further including a belt clip coupled to said housing.

11. The assembly according to claim 7, further including an attachment device disposed on said connector element for mounting said connector element to said electronic device.

12. The assembly according to claim 7, wherein said tether is between two feet and four feet in length.

13. The assembly according to claim 7, wherein said housing has a depression thereon and said attachment area is disposed in said depression, wherein said connector element is sized to fit within said depression.

14. A method of connecting an electronic device to an external object with a tether, comprising the steps of:

providing a housing having an attachment area thereon;

providing a connector element that is magnetically attracted to said attachment area, wherein said connector element is tethered to said housing with a flexible tether;

mounting said connector element to the electronic device;

connecting said housing to the external object; and magnetically connecting said connector element to said attachment area.

15. The method according to claim 14, further including the step of applying a retracting tension to said tether.

16. The method according to claim 14, wherein said step of mounting said connector element to said electronic device includes adhesively attaching said connector element to said electronic device.

17. The method according to claim 14, wherein said step of mounting said connector element to said electronic device includes mechanically attaching said connector element to said electronic device.

18. The method according to claim 14, wherein a belt clip is attached to said housing and said step of connecting said housing to said external object includes connecting said belt clip to said external object.

* * * * *